(12) United States Patent
Yoshida (10) Patent No.: US 10,082,615 B2
(45) Date of Patent: Sep. 25, 2018

(54) PLANAR ILLUMINATION APPARATUS

(71) Applicant: MINEBEA MITSUMI INC., Nagano (JP)

(72) Inventor: Takahito Yoshida, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/392,300

(22) Filed: Dec. 28, 2016

(65) Prior Publication Data

US 2017/0235037 A1 Aug. 17, 2017

(30) Foreign Application Priority Data

Feb. 12, 2016 (JP) .................................. 2016-025158

(51) Int. Cl.
*F21V 8/00* (2006.01)
(52) U.S. Cl.
CPC .......... *G02B 6/0051* (2013.01); *G02B 6/0031* (2013.01); *G02B 6/0083* (2013.01); *G02B 6/0086* (2013.01)
(58) Field of Classification Search
CPC .. G02B 6/0051; G02B 6/0083; G02B 6/0086; G02B 6/0088; G02B 6/009; G02B 6/0091
See application file for complete search history.

(56) References Cited

U.S. PATENT DOCUMENTS

| 2008/0192506 A1* | 8/2008 | Ohno | G02B 6/0025 |
| | | | 362/618 |
| 2009/0002598 A1* | 1/2009 | Choo | G02B 6/0091 |
| | | | 349/62 |
| 2009/0296423 A1* | 12/2009 | Kim | G02B 6/0021 |
| | | | 362/623 |
| 2011/0141397 A1* | 6/2011 | Lee | G02B 6/0083 |
| | | | 349/64 |
| 2012/0188482 A1* | 7/2012 | Lee | G02B 6/002 |
| | | | 349/62 |

(Continued)

FOREIGN PATENT DOCUMENTS

JP 2004-354727 A 12/2004
JP 2012-109103 A 6/2012

(Continued)

OTHER PUBLICATIONS

Notification of Reasons for Refusal dated Jan. 23, 2018 for corresponding Japanese Application No. 2016-025158.

*Primary Examiner* — Alexander Garlen
(74) *Attorney, Agent, or Firm* — Pearne & Gordon LLP (57) ABSTRACT

A planar illumination apparatus according to an embodiment includes a plurality of light sources, a light guide plate, a wiring substrate, a light diffusion sheet, a fixing member and an optical sheet. The light guide plate has a light entrance end surface and two main surfaces and emits, from at least one of the two main surfaces, the light entering the light entrance end surface. The wiring substrate extends so as to cover the light entrance end surface. The light diffusion sheet is arranged in a direction perpendicular to the main surfaces, one end portion of the light diffusion sheet running on the wiring substrate. The fixing member is arranged to cover the light diffusion sheet. The optical sheet is arranged between the light diffusion sheet and the fixing member. The light diffusion sheet includes a notch formed from the one end portion.

10 Claims, 4 Drawing Sheets

(56) References Cited

U.S. PATENT DOCUMENTS

2014/0111743 A1* 4/2014 Takemura ................ F21S 2/00
 349/64
2015/0219824 A1 8/2015 Kunimochi

FOREIGN PATENT DOCUMENTS

| JP | 2013-171723 A | 9/2013 |
| JP | 2015-144096 A | 8/2015 |
| WO | 2013/005554 A1 | 1/2013 |

* cited by examiner

PLANAR ILLUMINATION APPARATUS

CROSS-REFERENCE TO RELATED APPLICATION(S)

The present application claims priority to and incorporates by reference the entire contents of Japanese Patent Application No. 2016-025158 filed in Japan on Feb. 12, 2016.

BACKGROUND OF THE INVENTION

1. Field of the Invention

The present invention relates to a planar illumination apparatus.

2. Description of the Related Art

A planar illumination apparatus is used as a backlight of a liquid crystal display panel on a liquid crystal display apparatus. A sidelight-type planar illumination apparatus combining a light source as a light emitting element such as an LED with a light guide plate is widely used in a compact mobile information device such as a mobile phone (e.g. Japanese Patent Application Laid-open No. 2004-354727).

Such a planar illumination apparatus includes a frame-like light shielding member that defines an effective area for light emission. In order to realize miniaturization and design enhancement in the planar illumination apparatus, there is a demand for a narrower frame, that is, a demand for the light shielding member with a narrower width. For example, Japanese Patent Application Laid-open No. 2013-171723 discloses a planar illumination apparatus that realizes a narrower frame on two sides orthogonal to a light entrance side (light source placement side) of the light guide plate. This planar illumination apparatus has a structure in which a wiring substrate extends to cover a light entrance-side main surface of the light guide plate and an end portion of an optical sheet runs on the wiring substrate.

In recent years, the demand for a narrower frame is increasing not only on the two sides orthogonal to the light entrance side of the light guide plate but also on the light entrance side. The present inventors discovered, however, when the narrower frame on the light entrance side is implemented on the planar illumination apparatus having a structure in which the end portion of the optical sheet runs on the wiring substrate of the light source, as the planar illumination apparatus disclosed in Japanese Patent Application Laid-open No. 2013-171723, it would lead to a problem that luminance distribution of the outgoing light becomes unstable on a light emitting region on the light entrance side. The state in which the luminance distribution of the outgoing light is unstable implies the occurrence of uneven luminance distribution of the outgoing light in a light emitting region on the light entrance side on a certain planar illumination apparatus and the occurrence of different luminance distribution of the outgoing light between different planar illumination apparatuses.

The present invention is made in view of the above description and is intended to provide a planar illumination apparatus that has realized a narrower frame and suppression of instability of luminance distribution of the outgoing light.

SUMMARY OF THE INVENTION

It is an object of the present invention to at least partially solve the problems in the conventional technology.

A planar illumination apparatus according to an embodiment includes a plurality of light sources, a light guide plate, a wiring substrate, a light diffusion sheet, a fixing member, an optical sheet. The light guide plate has a light entrance end surface and two main surfaces, light emitted from the plurality of light sources entering the light entrance end surface and the two main surfaces intersecting the light entrance end surface and facing each other. The light guide plate guides the light entering the light entrance end surface, in a light guiding direction that is perpendicular to the light entrance end surface and emits, from at least one of the two main surfaces, the light entering the light entrance end surface. The wiring substrate extends so as to cover the light entrance end surface side of the at least one of the two main surfaces emitting light of the light guide plate and has a wiring pattern electrically connected with the plurality of light sources. The light diffusion sheet is arranged in a direction perpendicular to the at least one of the two main surfaces emitting the light of the light guide plate, one end portion of the light diffusion sheet running on the wiring substrate. The fixing member is arranged to cover the light diffusion sheet in a direction perpendicular to the at least one of the two main surfaces emitting the light of the light guide plate. The optical sheet is arranged between the light diffusion sheet and the fixing member in a direction perpendicular to at least one of the two main surfaces emitting the light of the light guide plate. The light diffusion sheet includes a notch formed from the one end portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a planar illumination apparatus according to the present invention will be described in detail with reference to the drawings. Note that the present invention is not limited by the embodiments. Furthermore, in the description of the drawings, the same reference signs are appropriately attached to the same components or corresponding components.

Figure 1:
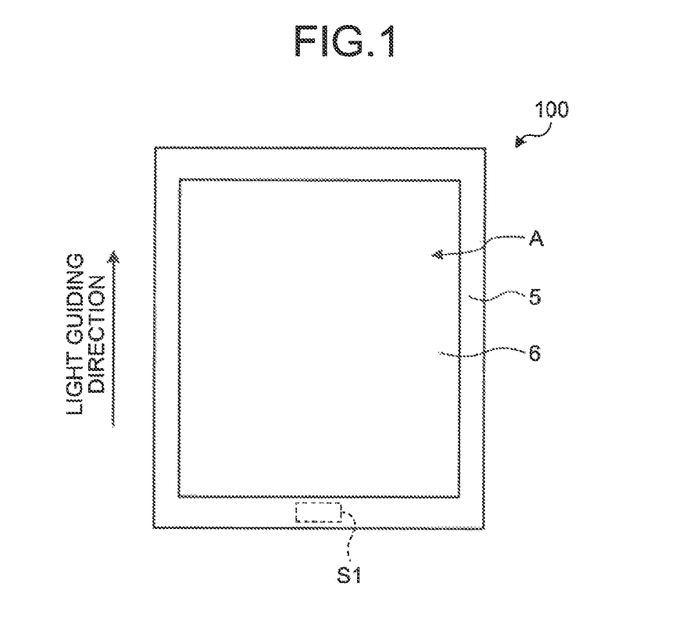
FIG. 1 is a plan view of a planar illumination apparatus according to an embodiment.
Figure 2:
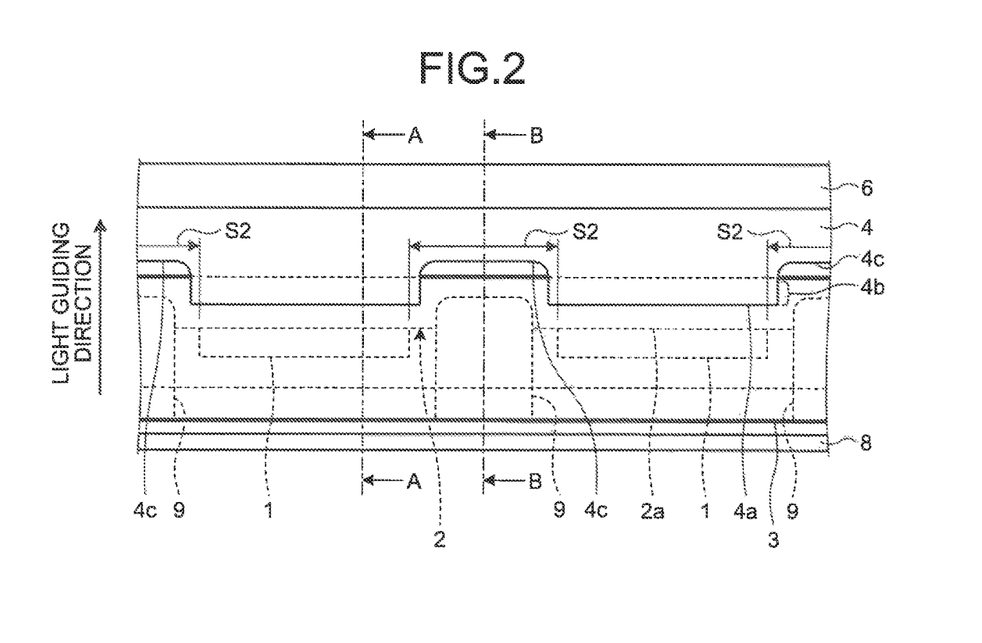
FIG. 2 is an enlargement of a partial region of FIG. 1.
Figure 3A:
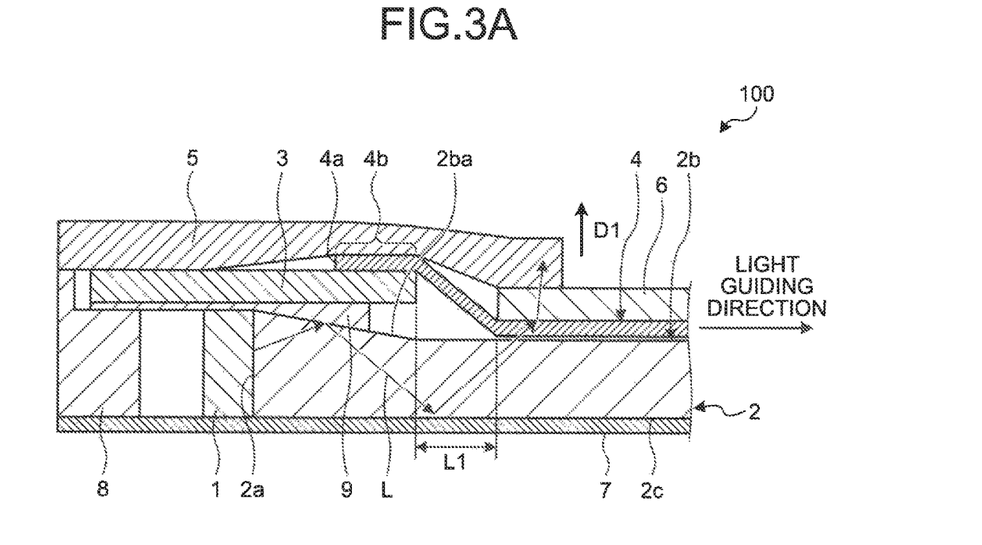
FIGS. 3A and 3B are diagrams illustrating cross sections corresponding to the A-A line and the B-B line in FIG. 2, respectively.
Figure 3B:
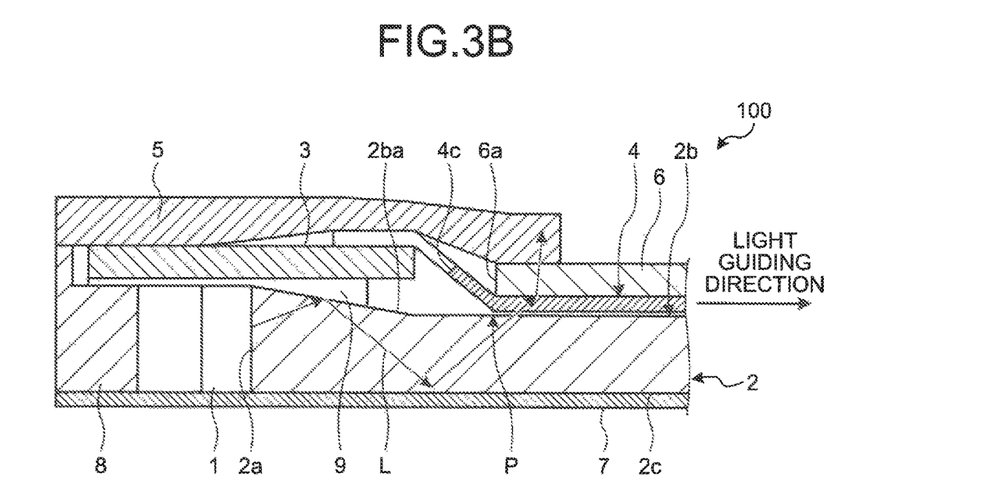

FIG. 1 is a plan view of a planar illumination apparatus according to an embodiment. FIG. 2 is an enlargement of a region S1 in FIG. 1. FIG. 3A is a diagram illustrating a cross section corresponding to the A-A line in FIG. 2. FIG. 3B is a diagram illustrating a cross section corresponding to the B-B line in FIG. 2. Note that, for explanation, FIG. 2 omits illustration of a light shielding member described below on the region S1. Hereinafter, a planar illumination apparatus 100 will be described with reference to FIGS. 1 to 3B.

The planar illumination apparatus 100 has a rectangular shape in plan view and includes a plurality of light sources 1, a light guide plate 2, a wiring substrate 3, a light diffusion sheet 4, a light shielding member 5 as a fixing member, an optical sheet 6, a reflection sheet 7, a frame 8, and a double-sided tape 9.

Each of the light sources 1 is a white LED that is a spot light source, for example, and emits light.

The light guide plate 2 is formed of a material (e.g. resin) transparent to the light emitted from each of the light sources 1. The light guide plate 2 includes a light entrance end surface 2a and two main surfaces 2b and 2c. On the light entrance end surface 2a, the plurality of light sources 1 is arranged apart from each other, for example, at an equal interval, such that its luminous surface faces the light entrance end surface 2a. The light emitted from each of the light sources 1 enters the light entrance end surface 2a. The light guide plate 2 has the light entrance end surface 2a and the two main surfaces 2b and 2c that intersect the light entrance end surface (being orthogonal in the present embodiment) and face each other. The light guide plate 2 guides the light incoming from the light entrance end surface 2a in the light guiding direction perpendicular to the light entrance end surface 2a and together with this, emits light from at least any one of the two main surfaces 2b and 2c. Note that in the present embodiment, the main surface 2b is the light emitting surface. The two main surfaces 2b and 2c are configured, on the light entrance end surface 2a side, such that an inclined region 2ba is formed on the main surface 2b to allow the thickness of the light guide plate 2 to gradually decrease toward the light guiding direction. Furthermore, the main surfaces 2b and 2c are parallel to each other and the thickness of the light guide plate 2 is substantially fixed in a region other than the region in which the inclined region 2ba is formed. Further, note that the light guide plate 2 need not include the inclined region 2ba. For example, the thickness may be substantially the same within a range from the light entrance end surface 2a to an end surface facing the light entrance end surface 2a.

The wiring substrate 3 has a wiring pattern electrically connected with the plurality of light sources 1 and supplies power to each of the light sources 1. As illustrated in FIGS. 2, 3A and 3B, the wiring substrate 3 extends in the light guiding direction so as to cover the light entrance end surface 2a side of the main surface 2b that emits light, on the light guide plate 2. Accordingly, the wiring substrate 3 is arranged more forwardly (upper position in the diagram) than the main surface 2b (portion. with a substantially fixed thickness). Note that, while the wiring substrate 3 is arranged on one plane in an exemplary diagram, it is allowable to arrange the wiring substrate 3 such that a portion that covers the inclined region 2ba is placed along the inclined region 2ba (may be bent in general to have a pointed angle at around the center).

The light diffusion sheet 4 is formed of a material (e.g., resin) that diffuses the light emitted from each of the light sources 1 and diffuses the light emitted from the main surface 2b of the light guide plate 2. The light diffusion sheet 4 is arranged in the direction perpendicular to the main surface 2b (direction D1 in FIG. 3A) and a region with a predetermined width from one end portion 4a of the light diffusion sheet 4 runs on the wiring substrate 3. The light diffusion sheet 4 is configured such that one end portion 4a side thereof is covered with the light shielding member 5. On the light diffusion sheet 4, a region in which the light diffusion sheet 4 runs on the wiring substrate 3 is defined as a region 4b.

The light shielding member 5 as a fixing member has a function to consolidate (fix) each of the members to configure the planar illumination apparatus 100, and has a function to integrate, as necessary, the planar illumination apparatus 100 with a liquid crystal display panel, in a case where the planar illumination apparatus 100 is used as a backlight of the liquid crystal display panel. Moreover, the light shielding member 5 (one form of realization of the fixing member) is formed of a material that shields the light that has been emitted from each of the light sources 1, that is, has a light shielding function. The light shielding member 5 has a frame-like shape and is arranged in a direction perpendicular to the main surface 2b that emits light of the light guide plate 2, so as to cover a peripheral region of the light diffusion sheet 4. The light shielding member 5 defines an effective area A of the main surface 2b. Note that the effective area A is an area obtained by removing a "non-effective area" that unavoidably appears in the vicinity of the end-edge portion of the main surface 2b of the light guide plate 2, for example, due to reduced uniformity of the outgoing light caused by light reflection, or the like, at the side-edge surface of the light guide plate 2.

The light shielding member 5 as a fixing member is attached, on the light entrance side, in the order from the backward position in the light guiding direction, the frame 8, the wiring substrate 3 (more specifically, a rear region thereof, which is not covered with the light diffusion sheet 4), the light diffusion sheet 4 (more specifically, the region 4b thereof, that is covering (running on) the wiring substrate 3), and the optical sheet 6 (end portion thereof on the light entrance side), thereby consolidating each of the members.

Note that the light shielding member 5 may be formed not only into a frame-like shape but also into a bar shape, for example, with main functions of fixing the members arranged on the light entrance side and specifying the effective area A on the light entrance side. Further, note that, instead of the light shielding member 5, it is allowable to configure using, for example, a double-sided tape with optical transparency (another form of the realization of the fixing member) in order to furnish the fixing member with mainly the fixing function, without furnishing it with the light shielding function or the effective area A specifying function.

The optical sheet 6 is arranged between the light diffusion sheet 4 and the light shielding member 5 in the direction D1 perpendicular to the main surface 2b. Note that the peripheral region of the optical sheet 6 is also covered with the light shielding member 5 and fixed onto the light shielding member 5. The optical sheet 6 has a function to control orientation of the light emitted from the main surface 2b of the light guide plate 2 and diffused by the light diffusion sheet 4. The optical sheet 6 is a prism sheet, for example. While the optical sheet 6 applied in the present embodiment is a sheet that combines two prism sheets, the optical sheet 6 may be formed with two separate prism sheets stacked with each other.

The reflection sheet 7 is provided on the main surface 2c of the light guide plate 2. The reflection sheet 7 has a function to reflect the light emitted from each of the light sources 1 and transmitted from the inside of the light guide plate 2 to reach the main surface 2c, toward the inside of the light guide plate 2. With this configuration, the main surface 2b is solely the light emission surface on the light guide plate 2 according to the present embodiment. With this configuration, the light that is supposed to be emitted from the main surface 2c side is emitted from the main surface 2b, making it possible to enhance utilization efficiency of the light emitted from each of the light sources 1, as the illumination light.

The frame 8 is a frame-like member formed of resin material, for example, that contains and/or supports each of components of the planar illumination apparatus 100 within the frame. Each of the components is fixed and supported onto the frame 8 with a double-sided tape, for example.

The double-sided tape 9 is provided for fixing the wiring substrate 3 onto the inclined region 2ba of the main surface 2b of the light guide plate 2 and onto the frame 8, and positioned in a region S2 between the plurality of light sources 1, as illustrated in FIG. 2. More precisely, the double-sided tape 9 is positioned in the region S2 forwardly located in the light guiding direction, between the plurality of the light sources 1. As other means to fix the wiring substrate 3 onto the light guide plate 2 and the frame 8 include, it is allowable to use, for example, adhesive instead of the double-sided tape 9.

As illustrated in FIGS. 2, 3A and 3B, the light diffusion sheet 4 has a plurality of notches 4c formed from the end portion 4a of the light diffusion sheet 4 on the light entrance end surface 2a-side of the light guide plate 2. The notch 4c is formed at least in the region 4b, and in the present embodiment, it extends beyond the region 4b in the light guiding direction. Note that each of the notches 4c extends within a range where the light diffusion sheet 4 is covered with the light shielding member 5 and is configured not to protrude to the effective area A.

Moreover, each of the notches 4c is configured to is positioned, in plan view, in the region S2 between the plurality of light sources 1.

In this manner, by forming the notch 4c on the light diffusion sheet 4, it is possible to soften the light diffusion sheet 4 to be easily bent. As a result, the structure in which the light diffusion sheet 4 is bent to run on the wiring substrate 3 is easily retained, and lifting of the light shielding member 5 would be suppressed or prevented. Accordingly, it is possible to suppress instability of luminance distribution of the outgoing light from the main surface 2b.

Hereinafter, a detailed description will be given.

In order to realize the narrower frame, the planar illumination apparatus 100 that employs a structure that the light diffusion sheet 4 is bent to run on the wiring substrate 3 is configured to provide a short length L1 of a portion across which the light diffusion sheet 4 is bent, as illustrated in FIG. 3A.

Meanwhile, when the light diffusion sheet 4 is bent, internal stress arises to act on the light diffusion sheet 4 to return to the flat shape because of elasticity the light diffusion sheet 4. When the length L1 is short, the light diffusion sheet 4 deforms greatly, leading to an increase in this internal stress.

Figure 4A:
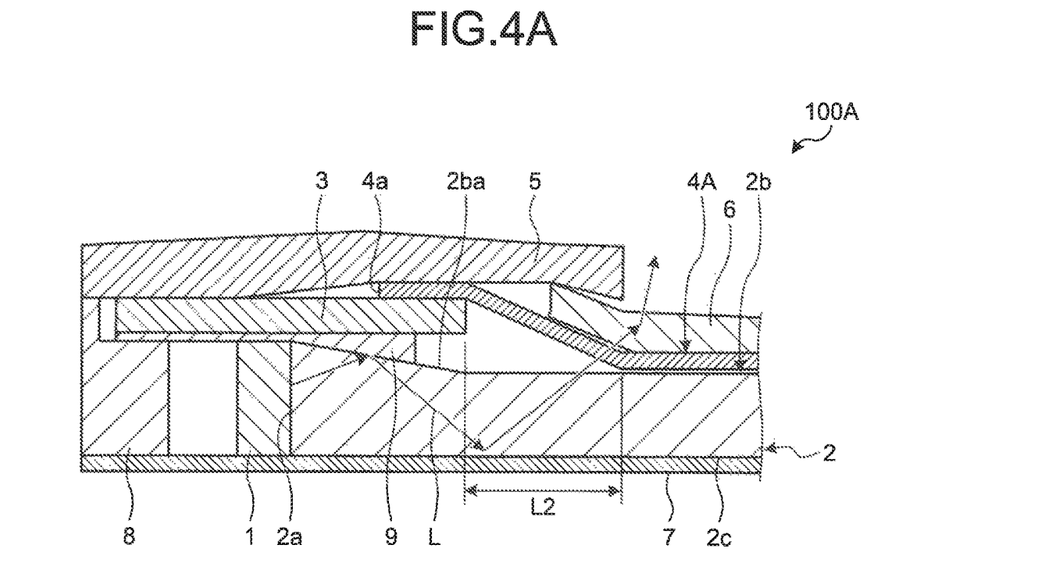
FIGS. 4A and 4B are diagrams illustrating instability of luminance distribution.

As a result, in the case of a planar illumination apparatus 100A that uses a light diffusion sheet 4A without the notch 4c while achieving the narrower frame with a technique similar to the technique in the planar illumination apparatus 100, there might be a case where, as illustrated in FIG. 4A, for example, the bending portion of the light diffusion sheet 4 is lifted from the main surface 2b of the light guide plate 2, on the opposite side of the end portion 4a. In this case, the length across the bending portions would become a length L2 greater than the length L1 and the end portion of the optical sheet 6, which has been covered with the light shielding member 5, might be lifted up, pushing up the light shielding member 5, in some cases. In this case, light L, which should be shielded by the light shielding member 5 in a state where there is no lifting of the light diffusion sheet 4, might leak and be emitted from the optical sheet 6.

The light L that leaked would lead to the occurrence of non-uniform luminance distribution of the outgoing light in the effective area on the light entrance side on the planar illumination apparatus 100A and the occurrence of differing luminance distribution of the outgoing light between different planar illumination apparatuses, and thus, would lead to instability of luminance distribution of the outgoing light. There is a tendency that the more the difference between the thickness of the light entrance end surface 2a of the light guide plate 2 and the thickness of the effective area A in conformity with the requirement of thinner planar illumination apparatuses, the more remarkable this instability.

Figure 4B:
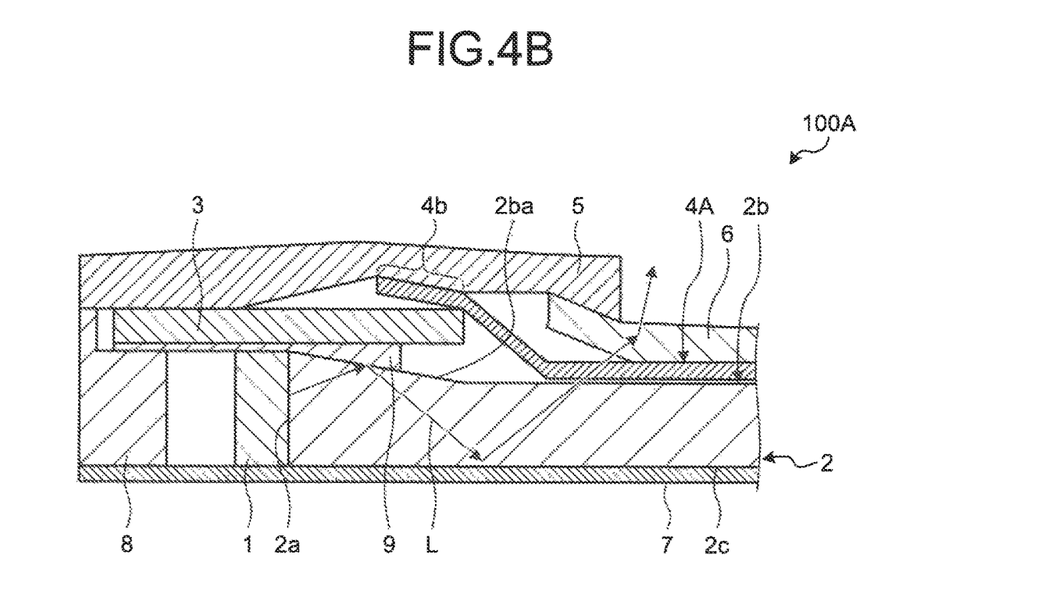

Moreover, in the case of the planar illumination apparatus 100A that uses the light diffusion sheet 4 without the notch 4c, there might be a case where, as illustrated in FIG. 4B, for example, the region 4b of the light diffusion sheet 4, that runs on the wiring substrate 3, might be lifted from the wiring substrate 3, in some cases. In this case, the region 4b pushes up the light shielding member 5 and the end portion of the optical sheet 6, fixed onto the light shielding member 5, might also be lifted, in some cases. In this case, the light L, which should be shielded by the light shielding member 5 in a state where there is no lifting of the region 4b, might leak and be emitted from the optical sheet 6.

The light L that leaked in this manner would also lead to instability of luminance distribution of the outgoing light of the planar illumination apparatus 100A

In contrast, as described above, the planar illumination apparatus 100 is configured such that the notch 4c is formed on the light diffusion sheet 4, thereby suppressing or preventing lifting of the light shielding member 5. Accordingly, the light L is shielded by the light shielding member 5. As a result, on the planar illumination apparatus 100 according to the present embodiment, instability of the luminance distribution of the outgoing light from the main surface 2b would be suppressed or prevented.

Note that, while the length of the notch 4c would preferably be the length that extends beyond the region 4b in the light guiding direction from the viewpoint of softening the light diffusion sheet 4, it would be sufficient that the notch 4c be formed at least in the region 4b. Also note that the present invention is not limited to this configuration. In addition, the notch 4c would preferably extend within a region where the light diffusion sheet 4 is covered with the light shielding member 5 because this would enable the light emitted from the main surface 2b toward the effective area A to reliably pass through the light diffusion sheet 4 and thus would realize desired light diffusion. Similarly, it would be preferable that the notch 4c is formed, in plan view, to be positioned in the region S2, between the plurality of light sources 1, because this would enable the light emitted from each of the light sources 1 and then emitted from the main surface 2b of the light guide plate 2 toward the effective area A to reliably pass through the light diffusion sheet 4 (in other words, to suppress the light incident on the notch 4c) and thus would realize desired light diffusion.

Figure 5A:
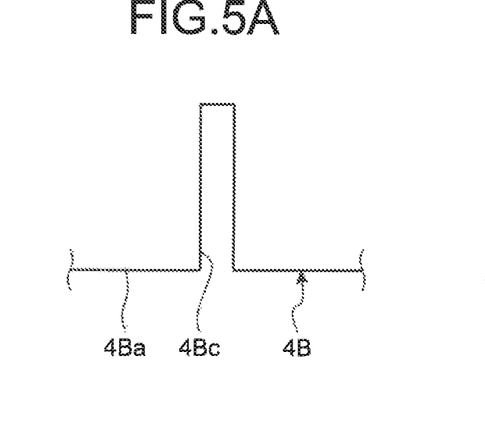
FIGS. 5A and 5B are diagrams illustrating another exemplary notch form on a light diffusion sheet.
Figure 5B:
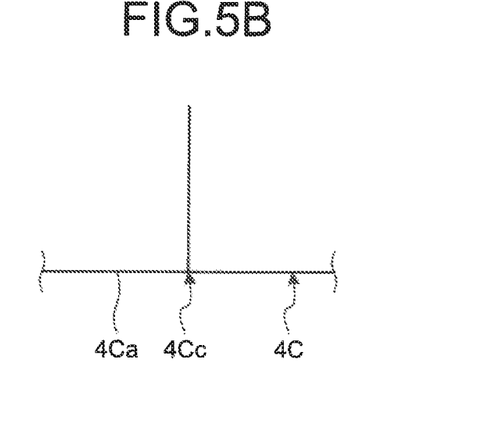

Note that the shape of the notch is not limited to the shape illustrated in FIG. 2. For example, as illustrated with a light diffusion sheet 4B in FIG. 5A, it would be allowable that a notch 4Bc formed from an end portion 4Ba (corresponding to the end portion 4a of the light diffusion sheet 4) has a narrow width. As another example, as illustrated with a light diffusion sheet 4C in FIG. 5B, it would be allowable that a notch 4Cc formed from an end portion 4Ca (corresponding to the end portion 4a of the light diffusion sheet 4) has substantially no width. In particular, with the notch 4Cc that has no width as illustrated in FIG. 5B, light would not easily leak from the notch 4Cc, and accordingly, the notch 4Cc may be formed in a forward position of the light source 1, in plan view. However, since the wider the width of the notch 4c of the light diffusion sheet 4, the softer the sheet and the broader the adhesive area between the light shielding member 5 and the wiring substrate 3, it would be preferable also in the viewpoint of adhesive strength.

Figure 6:
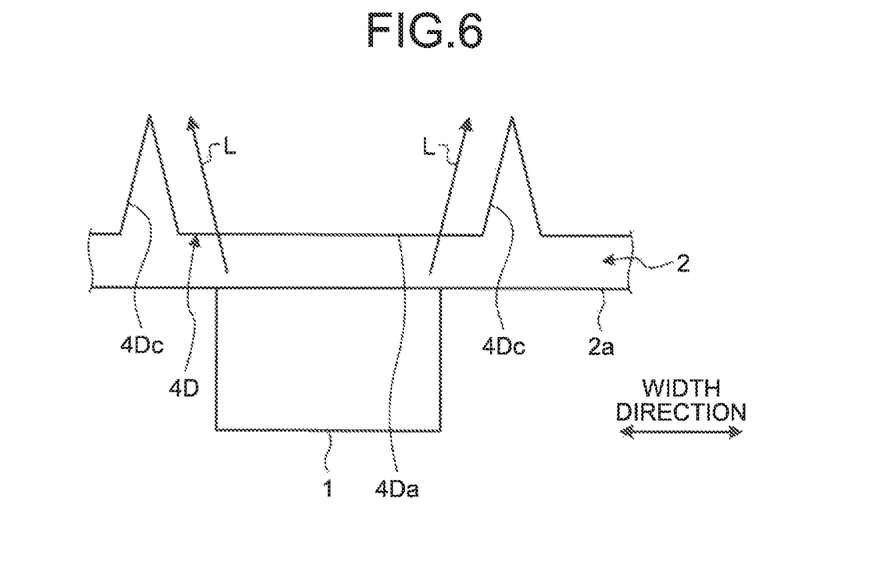
FIG. 6 is a diagram illustrating still another exemplary notch form on the light diffusion sheet.

As another example, as illustrated with a light diffusion sheet 4D in FIG. 6, it would be allowable that a notch 4Dc formed from an end portion 4Da (corresponding to the end portion 4a of the light diffusion sheet 4) has a wedge shape. In this case, it would be preferable to configure such that the wedge shape of the notch 4Dc would not overlap with the light that is emitted from the light source 1, incident on the light entrance end surface 2a of the light guide plate 2, and guided to expand in the width direction of the light guide plate 2. With this configuration, it is possible to prevent the light from leaking at the notch 4Dc, and effectively utilize the light emitted from the light source 1.

Note that in the above-described embodiment, it would be allowable to configure such that the light diffusion sheet 4 includes a perforation along an end portion 6a of the optical sheet 6 (that is, in the direction perpendicular to the sheet surface) at a position (position P in FIG. 3B) in the vicinity of the end portion 6a of the optical sheet 6 on the light entrance end surface 2a side of the light guide plate 2. With this configuration, it is possible to bend the light diffusion sheet 4 more easily.

According to the present invention, it is possible to suppress uneven luminance that occurs in the vicinity of the light entrance end surface of the light guide plate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination apparatus, comprising:
a plurality of light sources;
a light guide plate having a light entrance end surface and two main surfaces, light emitted from the plurality of light sources entering the light entrance end surface and the two main surfaces intersecting the light entrance end surface and facing each other, wherein the light guide plate is configured to guide the light entering the light entrance end surface, in a light guiding direction that is perpendicular to the light entrance end surface and is configured to emit, from at least one of the two main surfaces, the light entering the light entrance end surface;
a wiring substrate extending so as to cover the light entrance end surface side of the at least one of the two main surfaces emitting light of the light guide plate and having a wiring pattern electrically connected with the plurality of light sources;
a light diffusion sheet arranged in a direction perpendicular to the at least one of the two main surfaces emitting the light of the light guide plate, one end portion of the light diffusion sheet running on the wiring substrate;
a fixing member arranged to cover the light diffusion sheet in a direction perpendicular to the at least one of the two main surfaces emitting the light of the light guide plate; and
an optical sheet arranged between the light diffusion sheet and the fixing member in a direction perpendicular to the at least one of the two main surfaces emitting the light of the light guide plate, wherein the light diffusion sheet includes a notch formed as extending from the one end portion of the light diffusion sheet running on the wiring substrate, the notch extends across a border between a region where the light diffusion sheet covers the wiring substrate and a portion across which the light diffusion sheet is bent.

2. The planar illumination apparatus according to claim 1, wherein the notch is formed to be positioned in a region between the plurality of light sources in plan view.

3. The planar illumination apparatus according to claim 1, wherein the notch extends beyond a region in which the light diffusion sheet runs on the wiring substrate, in the light guiding direction, within a range where the light diffusion sheet is covered with the fixing member that has a light shielding property.

4. The planar illumination apparatus according to claim 1, wherein the notch has no width.

5. The planar illumination apparatus according to claim 1, wherein the notch has a wedge shape.

6. The planar illumination apparatus according to claim 1, wherein the light diffusion sheet has a perforation formed along an end portion of the optical sheet, at a position in a vicinity of the end portion of the optical sheet on the light entrance end surface side of the light guide plate.

7. The planar illumination apparatus according to claim 1, wherein the light guide plate includes an inclined region formed on the light entrance end surface side to allow a thickness of the light guide plate to gradually decrease toward a light guiding direction, and one end portion of the light diffusion sheet is arranged on the inclined region.

8. The planar illumination apparatus according to claim 1, wherein the fixing member is a light shielding member having a light shielding property.

9. The planar illumination apparatus according to claim 8, wherein a location of the notch is covered by the fixing member.

10. A planar illumination apparatus, comprising:
a plurality of light sources;
a light guide plate having a light entrance end surface and two main surfaces, light emitted from the plurality of light sources entering the light entrance end surface and the two main surfaces intersecting the light entrance end surface and facing each other, wherein the light guide plate is configured to guide the light entering the light entrance end surface, in a light guiding direction that is perpendicular to the light entrance end surface and is configured to emit, from at least one of the two main surfaces, the light entering the light entrance end surface;
a wiring substrate extending so as to cover the light entrance end surface side of the at least one of the two main surfaces emitting light of the light guide plate and having a wiring pattern electrically connected with the plurality of light sources;
a light diffusion sheet arranged in a direction perpendicular to the at least one of the two main surfaces emitting the light of the light guide plate, one end portion of the light diffusion sheet running on the wiring substrate;
a fixing member having a light shielding property arranged to cover the light diffusion sheet in a direction perpendicular to the at least one of the two main surfaces emitting the light of the light guide plate; and an optical sheet arranged between the light diffusion sheet and the fixing member in a direction perpendicular to the at least one of the two main surfaces emitting the light of the light guide plate, wherein the light diffusion sheet includes a notch formed from the one end portion, the notch extends beyond a region in which the light diffusion sheet runs on the wiring substrate, in the light guiding direction, and a location of the notch is covered with the fixing member.

* * * * *